United States Patent
Li et al.

(10) Patent No.: US 12,234,979 B2
(45) Date of Patent: Feb. 25, 2025

(54) BACKLIGHT MODULE AND DISPLAY DEVICE

(71) Applicants: Beijing BOE Chatani Electronics Co., Ltd., Beijing (CN); BOE Technology Group Co., Ltd., Beijing (CN)

(72) Inventors: Qilin Li, Beijing (CN); Qing Tian, Beijing (CN)

(73) Assignees: Beijing BOE Chatani Electronics Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/272,567

(22) PCT Filed: Oct. 22, 2021

(86) PCT No.: PCT/CN2021/125514
§ 371 (c)(1),
(2) Date: Jul. 15, 2023

(87) PCT Pub. No.: WO2022/193648
PCT Pub. Date: Sep. 22, 2022

(65) Prior Publication Data
US 2024/0318814 A1    Sep. 26, 2024

(30) Foreign Application Priority Data
Mar. 18, 2021  (CN) .......................... 202120561202.9

(51) Int. Cl.
*F21V 29/71* (2015.01)
*F21V 29/503* (2015.01)
(Continued)

(52) U.S. Cl.
CPC .......... *F21V 29/713* (2015.01); *F21V 29/503* (2015.01); *F21V 29/74* (2015.01); *F21Y 2115/10* (2016.08)

(58) Field of Classification Search
CPC ...... F21V 29/713; F21V 29/503; F21V 29/74; F21Y 2115/10; G02F 1/1336;
(Continued)

(56) References Cited

U.S. PATENT DOCUMENTS

2014/0140097 A1   5/2014  Hsiao et al.
2020/0004062 A1   1/2020  Li

FOREIGN PATENT DOCUMENTS

CN         1818762 A       8/2006
CN       101078835 A      11/2007
(Continued)

OTHER PUBLICATIONS

Machine translation of KR 101725001 B1 (Year: 2017).*
PCT/CN2021/125514 international search report.

*Primary Examiner* — Anne M Hines
*Assistant Examiner* — Jose M Diaz
(74) *Attorney, Agent, or Firm* — IPro, PLLC

(57) ABSTRACT

A backlight module and a display device. The backlight module includes a backplane (1), a lamp board (2), a thermally conductive connecting layer (3), and a heat dissipation assembly (4), the backplane (1) has a first surface and a second surface, which are opposite each other; the lamp board (2) is arranged on the first surface of the backplane (1); the thermally conductive connecting layer (3) is arranged between the lamp board (2) and the backplane (1), and the thermally conductive connecting layer (3) is connected to the lamp board (2); the heat dissipation assembly (4) is arranged on the second surface of the backplane (1), and the heat dissipation assembly (4) passes through the backplane (1) and is then connected to the thermally conductive connecting layer (3).

20 Claims, 8 Drawing Sheets

(51) Int. Cl.
*F21V 29/74* (2015.01)
*F21Y 115/10* (2016.01)

(58) Field of Classification Search
CPC .......... G02F 1/133602; G02F 1/133603; F21S 45/40; F21S 45/47–49
See application file for complete search history.

(56) References Cited

FOREIGN PATENT DOCUMENTS

| | | |
|---|---|---|
| CN | 204922693 U | 12/2015 |
| CN | 107577085 A | 1/2018 |
| CN | 210982984 U | 7/2020 |
| KR | 101725001 B1 * | 4/2017 |

* cited by examiner

01

E

41

41

BACKLIGHT MODULE AND DISPLAY DEVICE

CROSS REFERENCE TO RELATED APPLICATION

This application is a national phase entry under 35 U.S.C § 371 of International Application No. PCT/CN2021/125514, filed Oct. 22, 2021, which claims the priority to Chinese Patent Application No. 202120561202.9, filed with the China National Intellectual Property Administration on Mar. 18, 2021 and entitled "BACKLIGHT MODULE AND DISPLAY DEVICE", which is incorporated in its entirety herein by reference.

TECHNICAL FIELD

The present application relates to the technical field of display, and in particular to a backlight module and a display apparatus.

BACKGROUND

With development of a display technology, mini light emitting diode (MiniLED) wide color gamut has gradually become a vital development direction. A MiniLED technology, also known as an LED miniaturization and matrix technology, features a large number of MiniLED light-emitting chips arrayed on a MiniLED light-emitting board. Therefore, the MiniLED technology can achieve a precise dynamic backlight effect, and can further solve a glare phenomenon caused by traditional dynamic backlight between a bright region and a dark region of a screen while effectively improving brightness and contrast of the screen.

At present, a conventional backlight module using the MiniLED technology has too many LEDs, resulting in a large power consumption of the display apparatus and excessive heat emitted by a lamp board of the backlight module. An over-high temperature will significantly reduce brightness of the lamp board 02 and also affect service life of the lamp board.

SUMMARY

The present application discloses a backlight module and a display apparatus, which are configured to improve heat dissipation efficiency of a lamp board.

In order to achieve the above objective, the present application provides the following technical solution.

A backlight module includes:
a backplane, provided with a first surface and a second surface, which are opposite each other;
a lamp board, arranged at the first surface of the backplane;
a thermally conductive connecting layer, arranged between the backplane and the lamp board, and the thermally conductive connecting layer is connected with the lamp board; and
a heat dissipation assembly, arranged at the second surface of the backplane, and the heat dissipation assembly passes through the backplane and is then connected with the thermally conductive connecting layer.

Optionally, the thermally conductive connecting layer includes at least one thermally conductive sheet;
the at least one thermally conductive sheets each has a first thermally conductive portion and a second thermally conductive portion, the first thermally conductive portion is configured to be connected with the heat dissipation assembly, and the second thermally conductive portion is configured to be connected with the lamp board.

Optionally, the first thermally conductive portion and the second thermally conductive portion are integrally connected, and the heat dissipation assembly includes a heat sink.

Optionally, the backplane has a mounting hole for the heat sink to pass therethrough; and a size of the mounting hole is greater than the size of the heat sink in a first direction.

Optionally, in the first direction, two first displacement assemblies symmetrical with respect to the heat sink and two second displacement assemblies symmetrical with respect to the thermally conductive sheet are arranged on the backplane;
each of the two first displacement assemblies includes a first fixed portion and a first movable portion, where the first fixed portion is fixed to the backplane, the first movable portion is movable relative to the first fixed portion in the first direction, and the first movable portion abuts against the heat sink; and
each of the two second displacement assemblies includes a second fixed portion and a second movable portion, where the second fixed portion is fixed to the backplane, the second movable portion is movable relative to the second fixed portion in the first direction, and the second movable portion abuts against the thermally conductive sheet.

Optionally, the lamp board includes at least one lamp sub-board, and a gap is provided between any two adjacent lamp sub-boards; and
seam test holes are provided on the backplane, and are distributed along the gap.

Optionally, the first surface of the backplane is divided into a first region and a second region, and the first region includes at least one sinking recess, where the at least one sinking recess corresponds to the at least one thermally conductive sheet in a one-to-one correspondence, and the at least one sinking recess is configured to place the at least one thermally conductive sheet; and
a depth of the at least one sinking recess is not less than a thickness of the thermally conductive connecting layer, and a size of the sinking recess is greater than a size of the at least one thermally conductive sheet in the first direction.

Optionally, the first surface in which the second region is located is coated with thermally conductive silica gel.

Optionally, heat dissipation teeth are formed on a surface of the heat dissipation assembly facing away from the backplane; and
a thickness of a tooth root of the heat dissipation tooth is greater than a thickness of a tooth tip, and a distance between any two heat dissipation teeth is greater than twice the thickness of the tooth root.

A display apparatus includes a display panel and any one of the backlight modules according to the technical solution described above, where the display panel is arranged on a side of a light emitting surface of the backlight module.

DETAILED DESCRIPTION

The technical solutions in the embodiments of the present application are clearly and completely described below in combination with the accompanying drawings in the embodiments of the present application. Apparently, the embodiments described are merely some embodiments rather than all embodiments of the present application. On the basis of the embodiments in the present application, all other embodiments obtained by those of ordinary skill in the art without making creative efforts fall within the scope of protection of the present application.

Figure 1:
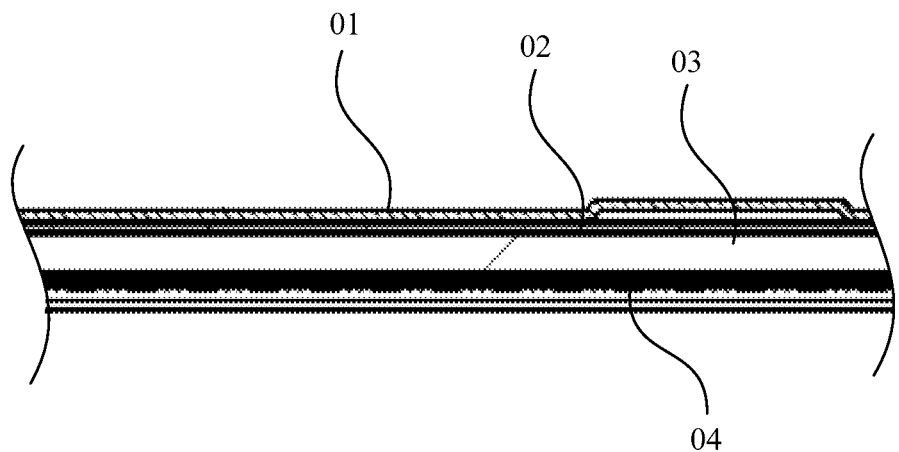
FIG. 1 is a schematic structural diagram of a backlight module in the prior art.
Figure 2:
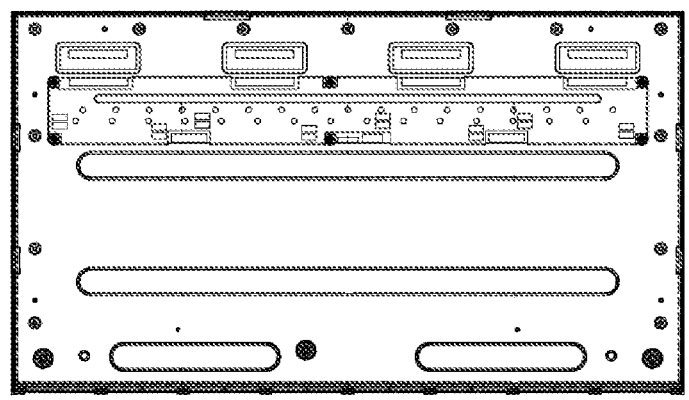
FIG. 2 is a schematic structural diagram of a backplane in the prior art.

For a structure of a conventional backlight module using the MiniLED technology at present, reference is made to FIG. 1. The backlight module includes a backplane 01 (for a structure of the backplane, reference is made to FIG. 2), a lamp board 02, a diffusion plate 03 and a film material 04 that are sequentially stacked. The lamp board 02 is fixed to the backplane 01 via a removable tape, the diffusion plate 03 is configured to diffuse light emitted by the lamp board 02 to form a surface light source, and the film material 04 is configured to intensify the brightness of the surface light source and convert the color of the surface light source. It can be seen that the excessive number of LEDs in the backlight module causes high power consumption of a display device and excessive heat emitted by the lamp board 02. An over-high temperature will significantly reduce brightness of the lamp board 02 and also affect service life of the lamp board.

As shown in FIG. 3 to FIG. 12B, embodiments of the present application provide a backlight module. The backlight module can be applied to a display apparatus to serve as a light source of a display panel.

Figure 3:
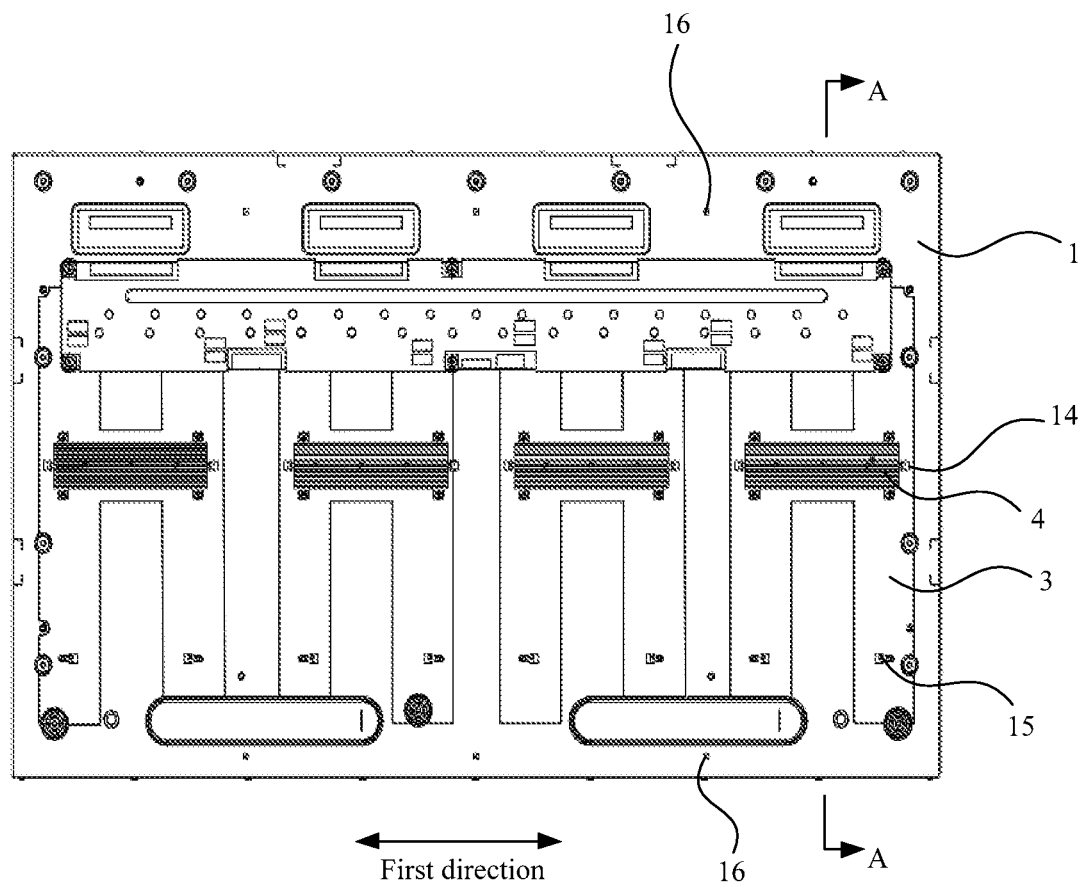
FIG. 3 is a schematic structural diagram of a backlight module according to an embodiment of the present application.
Figure 4:
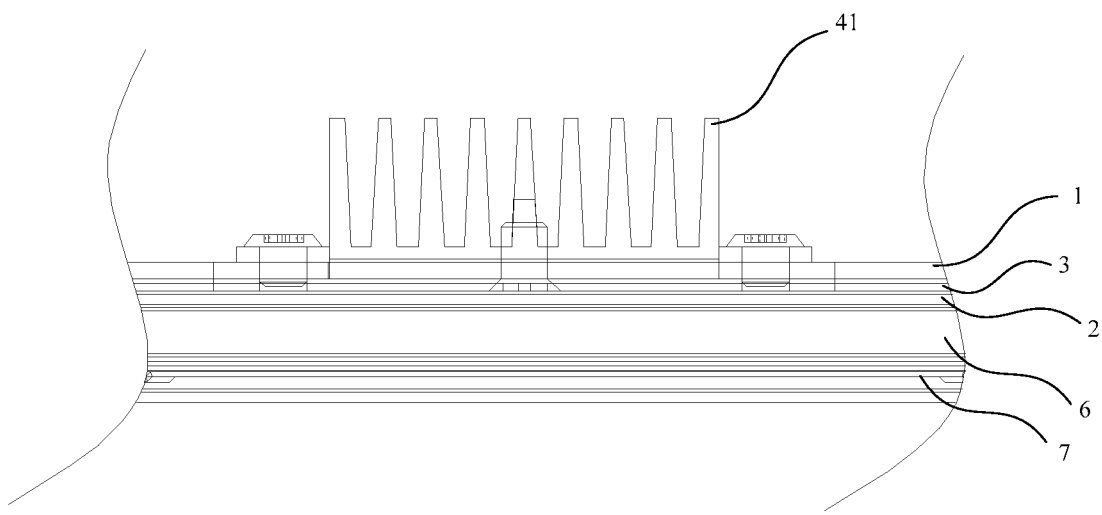
FIG. 4 is a schematic diagram of a sectional structure at A-A in FIG. 3.

FIG. 3 shows a schematic structural diagram of a back surface of a backlight module. FIG. 4 shows a schematic diagram of a partially sectional structure at a position A-A in FIG. 3. The backlight module includes a backplane 1, a lamp board 2, a thermally conductive connecting layer 3, and a heat dispassion assembly 4. The backplane 1 has a first surface and a second surface which are opposite each other, and FIG. 3 shows the second surface of the backplane 1. Therefore, the lamp board 2 is shielded by the backplane 1 and is not shown, and it should be understood that the thermally conductive connecting layer 3 in FIG. 3 is also shielded by the backplane 1, but the backplane 1 has a structure adapted to a shape of the thermally conductive connecting layer 3 herein, and reference numeral 3 in FIG. 3 shows a position of the thermally conductive connecting layer 3. The lamp board 2 is arranged at the first surface of the backplane 1. Specifically, the backplane 1 is located at a backlight side of the lamp board 2, the thermally conductive connecting layer 3 is arranged between the lamp board 4 and the backplane 1, and the lamp board 2 is bonded to the thermally conductive connecting layer 3 by a double-sided adhesive tape. The heat dissipation assembly 4 is arranged at the second surface of the backplane 1, i.e., at the side facing away from the lamp board 2, and the heat dissipation assembly 4 passes through the backplane 1 and then is connected to the thermally conductive connecting layer 3. Certainly, a diffusion plate 6 and a film material 7 are further sequentially arranged at a side of the lamp board 2 facing away from the backplane 1. It should be understood that the light board 2 herein is a mini lamp board.

Figure 5:
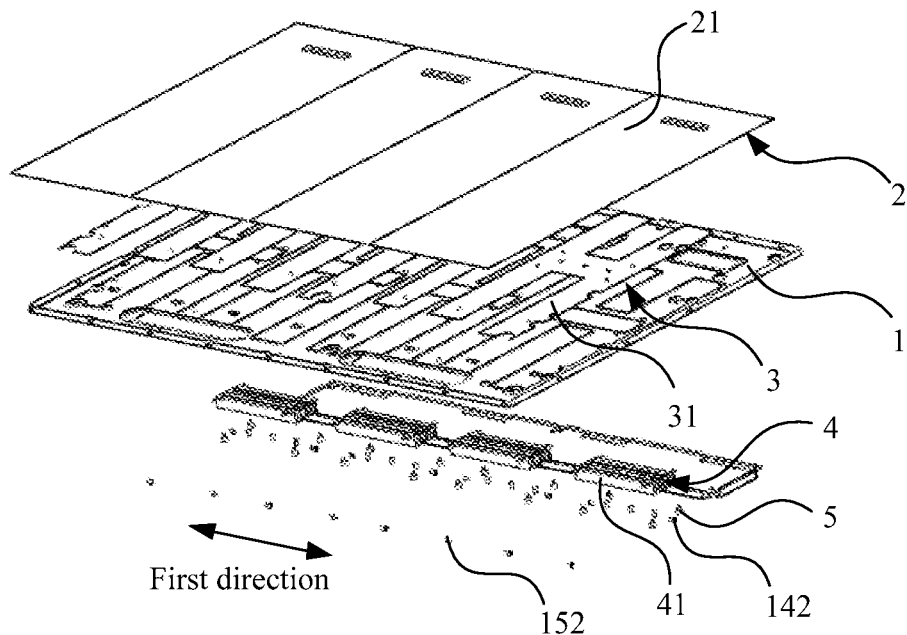
FIG. 5 is an exploded view of a backlight module according to an embodiment of the present application.

FIG. 5 shows an exploded view of a backlight module. In order to clearly show structures and matching relations of a backplane 1, a lamp board 2, a thermally conductive connecting layer 3 and a heat dissipation assembly 4, a diffusion layer 6 and a film material 7 at a side of the backplane 1 are omitted in FIG. 5.

The backplane 1 is configured to bear all other structures, the lamp board 2 is located at the first surface of the backplane 1, and the lamp board 2 may emit light along a direction of the first surface of the backboard 1 pointing towards the second surface. The thermally conductive connecting layer 3 is arranged between the lamp board 2 and the backplane 1. When the lamp board 2 emits light, generated heat may be conducted to the thermally conductive connecting layer 3. In addition, the thermally conductive connecting layer 3 is arranged between the backplane 1 and the lamp board 2, and may further have an effect of improving structural strength. Specifically, the thermally conductive connecting layer 3 may be bonded to the lamp board 2 together via a double-sided adhesive tape. The heat dissipation assembly 4 is arranged at the second surface of the backplane 1 and located outside an entire structure, and the heat dissipation assembly 4 passes through the backplane 1 and then is connected with the thermally conductive connecting layer 3, and heat of the thermally conductive connecting layer 3 may be dissipated to an external space by the heat dissipation assembly 4.

It can be seen that in the backlight module according to the embodiments of the present application, the thermally conductive connecting layer 3 arranged between the lamp board 2 and the backplane 1 can receive heat emitted by the lamp board 2 in time, and conduct the heat out via the heat dissipation assembly 4, thereby improving heat dissipation efficiency of the lamp board 2, protecting the lamp board 2, and facilitating prolonging of the service life of the lamp board.

Figure 6:
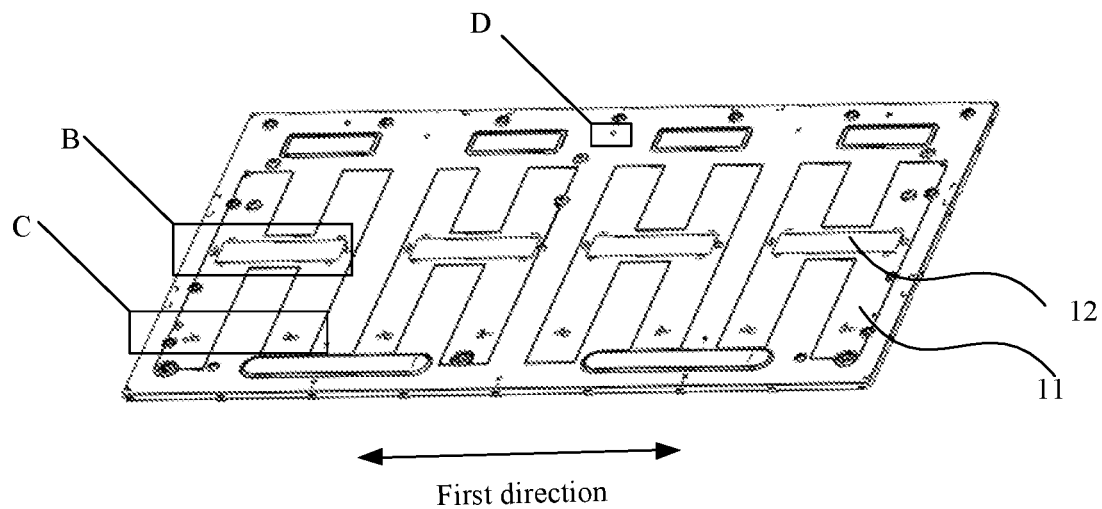
FIG. 6 is a schematic structural diagram of a backplane in a backlight module according to an embodiment of the present application.
Figure 9:
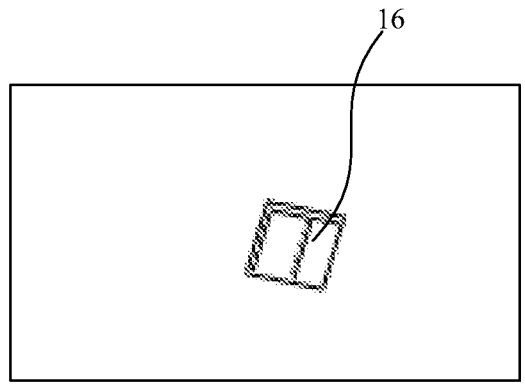
FIG. 9 is an enlarged view of D in FIG. 6.
Figure 12A:
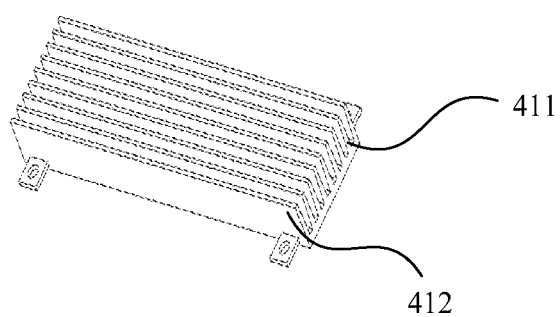
FIG. 12A and FIG. 12B are schematic structural diagrams of a heat sink in a backlight module according to an embodiment of the present application.
Figure 12B:
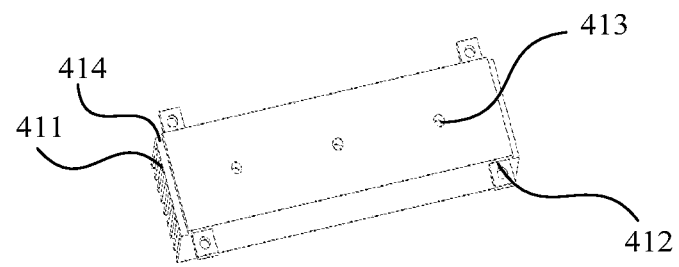

In a particular embodiment, in combination with a structure of FIG. 5, reference is made to a structure of a backplane 1 shown in FIG. 6, a structure of a thermally conductive connecting layer 3 shown in FIG. 9, and a structure of a heat dissipation assembly 4 shown in FIGS. 12a and 12b. In FIG. 5, a thermally conductive connecting layer 3 includes at least one thermally conductive sheet 31, a heat dissipation assembly 4 includes at least one heat sink 41 corresponding to the at least one thermally conductive sheet 31 in a one-to-one correspondence, and a lamp board 2 includes at least one lamp sub-board 21 corresponding to the at least one thermally conductive sheet 31 in a one-to-one correspondence. If an arrangement direction of the thermally conductive sheet 13 is configured as a first direction, the heat sink 41 is arranged in the first direction, and the lamp sub-board 21 is arranged in the first direction.

In FIG. 6, a first surface of the backplane 1 is divided into a first region and a second region. The first region includes at least one sinking recess 11. A shape of the sinking recess 11 matches a shape of the thermally conductive sheet 31, the at least one sinking recess 11 corresponds to the at least one thermally conductive sheet 31 in a one-to-one correspondence, and the at least one thermally conductive sheet 31 may be placed into the at least one sinking recess 11. Therefore, a depth of the sinking recess 11 should not be less than a thickness of the thermally conductive sheet 31. After the thermally conductive sheet 31 is placed into the sinking recess 11, the thermally conductive sheet 31 does not protrude from a surface of the backboard 1, such that an original structure of a backlight module is not affected, and a thickness of the backlight module is not increased, which is conducive to light and thin design of a display device. Moreover, in the first direction, the sinking recess 11 has a size greater than that of the thermally conductive sheet 31, and the thermally conductive sheet 31 may move in the sinking recess 11 in the first direction. It should be understood that structural arrangement of the sinking recess 11 can enhance strength of the backplane 1 and have an effect of a reinforcing rib.

The first surface in which the second region is located (i.e., other regions apart from a region in which the sinking recess 11 is located) is coated with thermally conductive silica gel, and the second region makes contact with the lamp board 2. The thermally conductive silica gel herein is a high-end thermally conductive compound having the characteristics of a single component, thermal conductivity and room temperature curing. Generally, the thermally conductive silica gel may not be cured quickly, and is normally cured after 24 hours. Therefore, when the thermally conductive silica gel is not cured, the lamp sub-board 21 may be adjusted relative to the backplane 1.

Correspondingly, the backplane 1 has a mounting hole 12 for the heat sink 41 to pass therethrough, and the heat sink 41 passes through the mounting hole 12 and then is connected with the thermally conductive connecting layer 3. In order to make the heat sink 41 pass through the mounting hole conveniently, a shape of the mounting hole 12 matches a shape of the heat sink 41, and in the first direction, a size of the mounting hole 12 is greater than a size of the heat sink 414. It should be understood that only part of the heat sink 41 herein passes through the mounting hole 12 to be connected to the thermally conductive connecting layer, and most of the heat sink is located at the side of the backplane 1 facing away from the lamp board 2, so as to facilitate heat dissipation.

It may be seen from FIG. 5 that a gap is provided between any two adjacent lamp sub-boards 21, a size of the gap may affect display of backlight, and a size of the lamp sub-board 21 may have a tolerance. Therefore, the lamp sub-board needs to be manually measured and adjusted during mounting. Therefore, in the embodiments of the present application, the lamp sub-board 21 is adjusted to make a joint between any two adjacent lamp sub-boards 21 satisfy requirements.

Figure 7A:
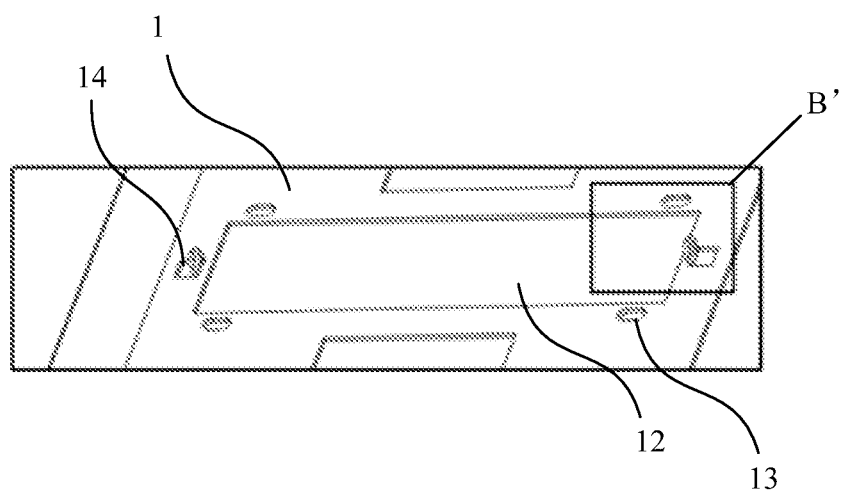
FIG. 7A is an enlarged view of B in FIG. 6.

With reference to FIG. 7A showing a mounting hole 12 configured to mount a heat sink 41 in a matched manner, a size of the mounting hole 12 in a first direction is greater than a size of the heat sink 41 in the first direction. A connecting hole 13 is provided around the mounting hole 12, and the connecting hole 13 is an oblong hole. The heat sink 41 is connected with the connecting hole 13 via a first connector 5, and the first connector 5 herein may be a screw or a bolt. The first connector 5 may slide in the connecting hole 13 in the first direction, such that the heat sink 41 moves relative to the backplane in the first direction. Certainly, the number of the first connectors 5 is not limited herein, and the heat sink 41 herein may be made of an aluminum profile.

Figure 7B:
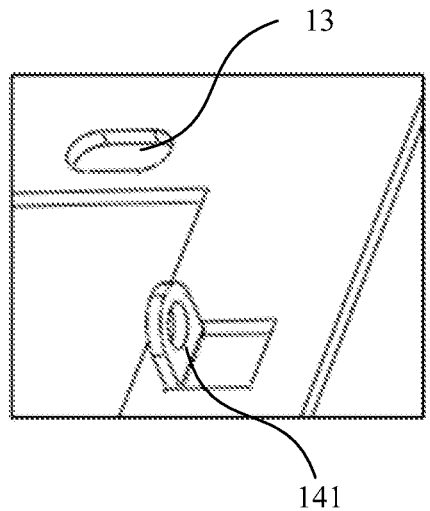
FIG. 7B is an enlarged view of B' in FIG. 7A.
Figure 7C:
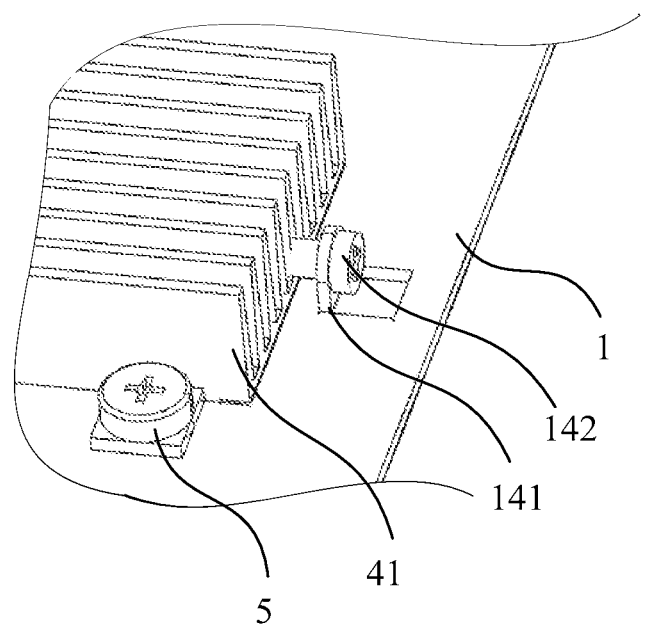
FIG. 7C is a schematic diagram of a connection structure between a heat sink and a backplane in a backlight module according to an embodiment of the present application.

In the first direction, two first displacement assemblies 14 symmetrical with respect to the heat sink 41 are arranged on the backplane 1. With reference to FIG. 7B, each first displacement assembly 14 includes a first fixed portion 141 and a first movable portion 142 (as shown in FIG. 5). The first movable portion 142 may move relative to the first fixed portion 141 in the first direction, and the first movable portion 142 abuts against the heat sink 41 (see FIG. 7C for details). Herein, the first movable portion 142 is a screw or a bolt, and the first movable portion 142 is in threaded connection with the first fixing portion 141. When the first movable portion 142 rotates relative to the first fixed portion 141, the first movable portion 142 is movable relative to the first fixed portion 141 in the first direction, and the first movable portions 142 of the two first displacement assemblies 14 may be cooperatively adjusted, such that the heat sink 41 may be pushed to move relative to the backplane 1 in the first direction.

Figure 8A:
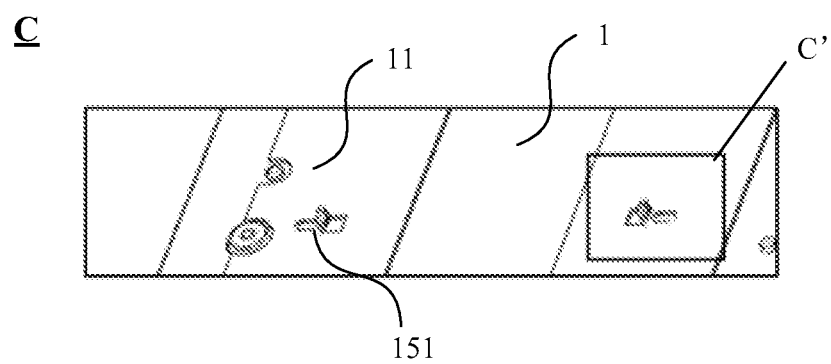
FIG. 8A is an enlarged view of C in FIG. 6.
Figure 8B:
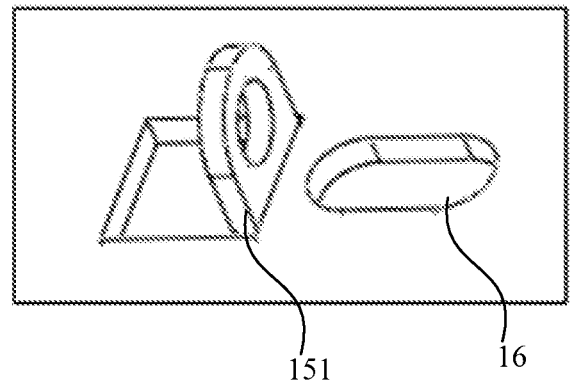
FIG. 8B is an enlarged view of C' in FIG. 8A.

Moreover, in the first direction, two second displacement assemblies 15 symmetrical with respect to the heat sink 31 are arranged on the backplane 1. With reference to FIG. 8A, each second displacement assembly 15 includes a second fixed portion 151 and a second movable portion 152 (as shown in FIG. 5). The second movable portion 152 is movable relative to the second fixed portion 151 in the first direction, and the second movable portion 152 abuts against the thermally conductive sheet 31. Herein, the second movable portion 152 is a screw or a bolt, and the second movable portion 152 is in threaded connection with the second fixed portion 151. When the second movable portion 152 rotates relative to the second fixed portion 151, the second movable portion 152 is movable relative to the second fixed portion 151 in the first direction, and the second movable portions 152 of the two second displacement assemblies 15 may be cooperatively adjusted, such that the thermally conductive sheet 31 may be pushed to move relative to the backplane 1 in the second direction.

Under cooperation of the first displacement assembly 14 and the second displacement assembly 15, in the first direction, the lamp sub-board 21 may be pushed to move relative to the backplane 1 by pushing the heat sink 41 and the thermally conductive sheet 31, such that the gap between two adjacent lamp sub-boards 21 may be adjusted.

In order to conveniently measure a size of the gap between two adjacent lamp sub-boards 21, as shown in FIG. 9, for the gap between any two adjacent lamp sub-boards 21, two seam test holes 16 distributed along the gap are provided on the backplane 1.

Figure 10:
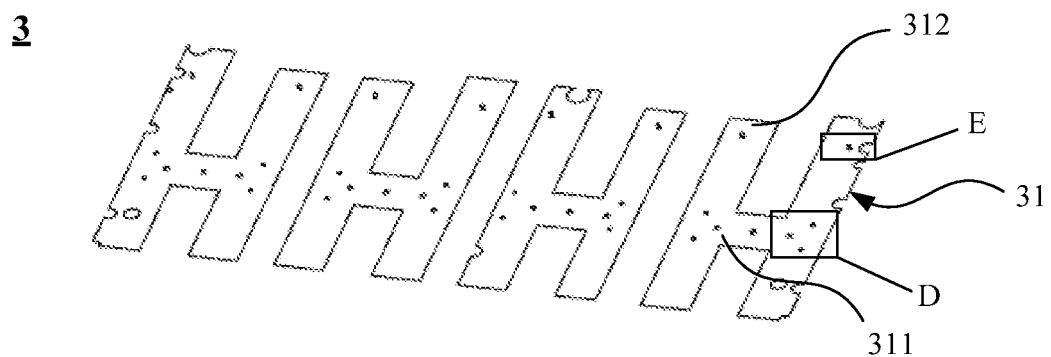
FIG. 10 is a schematic structural diagram of a thermally conductive connecting layer in a backlight module according to an embodiment of the present application.

In a specific structure, as shown in FIG. 10, a thermally conductive connecting layer 3 includes at least one thermally conducting sheet 31. Each thermally conductive sheet 31 includes a first thermally conductive portion 311 and at least one second thermally conductive portion 312, where the first thermally conductive portion 311 and the second thermally conductive portion 312 are of an integrated structure. The first thermally conductive portion 311 is configured to be connected with the heat dissipation assembly 4, and each second thermally conductive portion 312 extends from the first thermally conductive portion 311, such that the at least one second thermally conductive portion 312 may be connected to a lamp board 2 having a larger area according to heat dissipation requirements, so as to absorb heat of the lamp board 2 as much as possible.

With reference to FIG. 10, each thermally conductive sheet 31 is "H"-shaped, a short portion of the "H"-shaped corresponds to the first thermally conductive portion 311, and a strip-shaped portion of the "H"-shaped extending from a periphery is equivalent to the second thermally conductive portion 312. During operation, the first thermally conductive portion 311 is connected with the heat dissipation assembly, and the second thermally conductive portion 312 has a large contact area with the lamp board 2. In order to better dissipate heat of the lamp board 2, a plurality of thermally conductive sheets 31 may be arranged. The plurality of thermally conductive sheets 31 are uniformly distributed as far as possible, so as to obtain a large contact area with the lamp board 2. With a structure shown in FIG. 5 as an example, a thermally conductive connecting layer 3 includes four "H"-shaped thermally conductive sheets 31. A heat dissipation assembly 4 includes four heat sinks 41. One thermally conductive sheet 31 corresponds to one heat sink 41, and in a group of thermally conductive sheet 31 and the heat sink 41 corresponding to each other, only the first thermally conductive portion 311 on the thermally conductive sheet 31 is connected to the heat sink 41. Therefore, an area of the backplane 1 covered with the heat sink 41 is small, which does not affect heat dissipation of an entire structure.

In addition, the thermally conductive sheet 31 needs to have an excellent thermal conduction function, and the thermally conductive sheet 31 may be copper, copper alloy, or other materials having high heat conductivity. Moreover, as shown in FIG. 5, the thermally conductive sheet 31 may have an effect of a reinforcing rib between the backplane 1 and the lamp board 2, thereby enhancing strength of the entire structure. Certainly, the shape of the thermally conductive sheet 31 shown in FIG. 10 is only an example. The thermally conductive sheet 31 may further be implemented in other structures, such as an "S"-shaped structure and a radial structure, which will not be described herein.

Figure 11A:
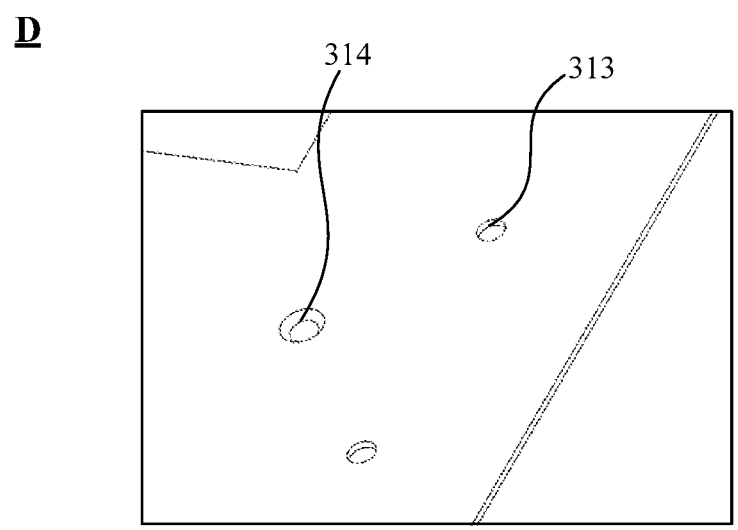
FIG. 11A is an enlarged view of D in FIG. 10.

The heat sink 41 is further connected with the thermally conductive sheet 31 through a second connector. As shown in FIG. 11A, a sinking recess 313 configured to match the second connector is further arranged on the thermally conductive sheet 31. It should be understood that connection between the heat sink 41 and the thermally conductive sheet 31 mainly has an effect of tight attachment, and has a small fixing effect.

The heat sink 41 is connected with the backplane 1 via the first connector 5. In order to prevent the first connector 5 from jacking up the thermally conductive sheet 31 of the thermally conductive connecting layer 3 when the heat sink 41 is connected with the backplane 1, and a first avoiding hole 314 configured with avoid the first connector is provided on the thermally conductive sheet 31. It should be understood that the number and position of the first avoiding holes 314 need to correspond to the number and position of the connecting holes 13 on the backplane 1. However, a size of the first avoiding hole 314 needs to be greater than a size of the connecting hole 13. After the heat sink 41 is connected to the backplane 1, the first connector 5 corresponds to the first avoiding hole 314, such that the situation that the first connector 5 jacks up the thermally conductive sheet 31, such that a surface of the thermally conductive sheet 31 is uniform, thereby affecting attachment of the lamp board 2 may be avoided.

Figure 11B:
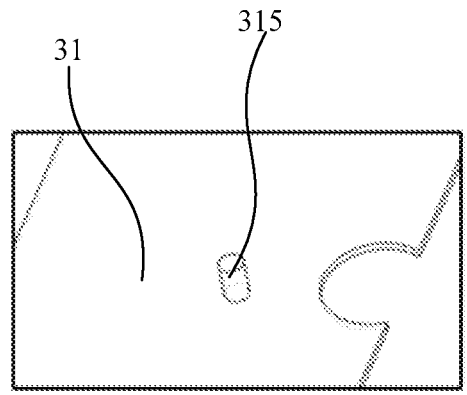
FIG. 11B is an enlarged view of E in FIG. 10.

In the above, the second movable portion 152 of the second displacement assembly arranged on the backplane 1 abuts against the thermally conductive sheet 31. As shown in FIG. 11B, a riveting column 315 is arranged on the thermally conductive sheet 31, and the second movable portion 152 abuts against the riveting column 315. It should be understood that for the two second displacement assemblies, two riveting columns 315 are also arranged, one riveting column 315 corresponds to one second movable portion 152, and the two riveting columns 315 are stressed in one direction and have opposite stress directions. In operation, the second movable portion 152 in the two second displacement assemblies are adjusted to move relative to the second fixed portion 151 in the first direction, such that the thermally conductive sheet 31 may be pushed to move relative to the backplane 1 by means of the riveting column 315.

Heat dissipation teeth 411 are formed on a surface of the heat dissipation assembly 4 facing away from the backplane 1 according to the embodiments of the present application. Specifically, with reference to FIG. 12A, the heat dissipation teeth 411 are formed at a surface of the heat sink 41 facing away from the backplane 1. A height of vertical teeth of the heat dissipation tooth 411 should not be too high. In principle, the heat dissipation tooth 411 has a height not higher than 8 mm. A connecting lug 412 configured to match the first connector 5 is further arranged on the heat sink 41. During mounting, the first connector 5 passes through the connecting lug 412 to connect the heat sink 41 to the backplane 1. With reference to a schematic structural diagram of a heat sink 41 from another perspective shown in FIG. 12B, a connecting hole 413 is further provided on the heat sink 41, and the connecting hole 413 matches a sinking recess 313 of the thermally conductive sheet 31. During mounting, a second connector passes through the connecting hole 413 and matches the sinking recess 313 to connect the heat sink 41 to the thermally conductive sheet 31.

As shown in FIG. 12B, an avoiding recess 414 is formed on a surface of the heat sink 41 facing the backplane 1, so as to conveniently adjust the heat sink 41 relative to the backplane 1.

A tooth root of the heat dissipation tooth 411 has a thickness greater than a thickness of a tooth tip, such that firmness of the heat dissipation tooth may be improved. A distance between any two heat dissipation teeth is greater than twice the thickness of the tooth root, and a large tooth spacing is conducive to heat dissipation. With a structure of the heat sink 41 shown in FIG. 10 as an example, a surface area of the heat sink may reach 40% of a surface of the backplane 1 on the side facing away from the lamp board 2, such that thermal conduction and heat dissipation efficiency may be optimized.

In addition, in order to improve a heat dissipation effect, the surface of the heat sink 41 of the heat dissipation assembly 4 configured to be connected with the thermally conductive connecting layer 3 may also be coated with thermally conductive silica gel. Preferably, the surface of the heat sink 41 configured to be connected with the thermally conductive connecting layer 3 is fully coated with the thermally conductive silica gel.

The embodiments of the present application further provide a display apparatus. The display apparatus includes a display panel and any one of the backlight modules described above, where the display panel is arranged on a side of a light emitting surface of the backlight module. That is, the display panel is arranged on a side of a thermally conductive connecting layer 3. Due to the thermally conductive connecting layer 3 and a heat dissipation assembly 4, the display device has excellent heat dissipation efficiency and a stabler structure.

Apparently, those skilled in the art can make various modifications and variations to the embodiments of the present application without departing from the spirit and scope of the present application. In this way, if these modifications and variations of the present application fall within the scope of the claims of the present application and equivalent technologies of the claims, the present application is also intended to include these modifications and variations.

What is claimed is:

1. A backlight module, comprising:
   a backplane, having a first surface and a second surface opposite each other;
   a lamp board, arranged at the first surface of the backplane;
   a thermally conductive connecting layer, arranged between the backplane and the lamp board, wherein the thermally conductive connecting layer is connected with the lamp board; and
   a heat dissipation assembly, arranged at the second surface of the backplane, wherein the heat dissipation assembly passes through the backplane and is then connected with the thermally conductive connecting layer, the heat dissipation assembly comprises a heat sink;
   wherein the backplane has a mounting hole for the heat sink to pass therethrough; and
a size of the mounting hole is greater than a size of the heat sink in a first direction.

2. The backlight module according to claim 1, wherein the thermally conductive connecting layer comprises at least one thermally conductive sheet, wherein
   the at least one thermally conductive sheet each has a first thermally conductive portion and a second thermally conductive portion, wherein the first thermally conductive portion is configured to be connected with the heat dissipation assembly, and the second thermally conductive portion is configured to be connected with the lamp board.

3. The backlight module according to claim 2, wherein the first thermally conductive portion and the second thermally conductive portion are integrally connected.

4. The backlight module according to claim 3, wherein in the first direction, two first displacement assemblies symmetrical with respect to the heat sink and two second displacement assemblies symmetrical with respect to the thermally conductive sheet are arranged on the backplane;
   each of the two first displacement assemblies comprises a first fixed portion and a first movable portion, wherein the first fixed portion is fixed to the backplane, the first movable portion is movable relative to the first fixed portion in the first direction, and the first movable portion abuts against the heat sink; and
   each of the two second displacement assemblies comprises a second fixed portion and a second movable portion, wherein the second fixed portion is fixed to the backplane, the second movable portion is movable relative to the second fixed portion in the first direction, and the second movable portion abuts against the thermally conductive sheet.

5. The backlight module according to claim 3, wherein the lamp board comprises at least one lamp sub-board, and a gap is provided between any two adjacent lamp sub-boards; and
   seam test holes are provided on the backplane, and are distributed along the gap.

6. The backlight module according to claim 2, wherein the first surface of the backplane is divided into a first region and a second region, and the first region comprises at least one sinking recess, wherein the at least one sinking recess corresponds to the at least one thermally conductive sheet in a one-to-one correspondence, and the at least one sinking recess is configured to place the at least one thermally conductive sheet; and
   a depth of the at least one sinking recess is not less than a thickness of the thermally conductive connecting layer, and a size of the at least one of sinking recess is greater than a size of the at least one thermally conductive sheet in the first direction.

7. The backlight module according to claim 6, wherein the first surface in which the second region is located is coated with thermally conductive silica gel.

8. The backlight module according to claim 1, wherein heat dissipation teeth are formed on a surface of the heat dissipation assembly facing away from the backplane; and
   a thickness of a tooth root of the heat dissipation tooth is greater than a thickness of a tooth tip, and a distance between any two heat dissipation teeth is greater than twice the thickness of the tooth root.

9. A display apparatus, comprising a display panel and the backlight module of claim 1, wherein the display panel is arranged on a side of a light emitting surface of the backlight module.

10. The backlight module according to claim 1, wherein a surface of the heat sink configured to be connected with the thermally conductive connecting layer is coated with thermally conductive silica gel.

11. The backlight module according to claim 1, wherein a connecting hole is provided around the mounting hole, and the heat sink is connected with the connecting hole via a first connector.

12. The backlight module according to claim 11, wherein the heat sink is connected with the backplane through the first connector.

13. The backlight module according to claim 12, wherein the thermally conductive sheet is provided with a first avoiding hole configured with avoid the first connector.

14. The backlight module according to claim 13, wherein a position of the first avoiding hole corresponds to a position of the connecting hole; and a size of the first avoiding hole is greater than a size of the connecting hole.

15. A backlight module, comprising:
   a backplane, having a first surface and a second surface opposite each other;
   a lamp board, arranged at the first surface of the backplane;
   a thermally conductive connecting layer, arranged between the backplane and the lamp board, wherein the thermally conductive connecting layer is connected with the lamp board; and
   a heat dissipation assembly, arranged at the second surface of the backplane, wherein the heat dissipation assembly passes through the backplane and is then connected with the thermally conductive connecting layer;

wherein the lamp board comprises at least one lamp sub-board, and a gap is provided between any two adjacent lamp sub-boards; and seam test holes are provided on the backplane, and are distributed along the gap.

16. The backlight module according to claim 15, wherein the thermally conductive connecting layer comprises at least one thermally conductive sheet, wherein the at least one thermally conductive sheet each has a first thermally conductive portion and a second thermally conductive portion, wherein the first thermally conductive portion is configured to be connected with the heat dissipation assembly, and the second thermally conductive portion is configured to be connected with the lamp board.

17. The backlight module according to claim 16, wherein the first surface of the backplane is divided into a first region and a second region, and the first region comprises at least one sinking recess, wherein the at least one sinking recess corresponds to the at least one thermally conductive sheet in a one-to-one correspondence, and the at least one sinking recess is configured to place the at least one thermally conductive sheet; and a depth of the at least one sinking recess is not less than a thickness of the thermally conductive connecting layer, and a size of the at least one of sinking recess is greater than a size of the at least one thermally conductive sheet in the first direction.

18. The backlight module according to claim 17, wherein the first surface in which the second region is located is coated with thermally conductive silica gel.

19. The backlight module according to claim 15, wherein heat dissipation teeth are formed on a surface of the heat dissipation assembly facing away from the backplane; and a thickness of a tooth root of the heat dissipation tooth is greater than a thickness of a tooth tip, and a distance between any two heat dissipation teeth is greater than twice the thickness of the tooth root.

20. A backlight module, comprising:

a backplane, having a first surface and a second surface opposite each other;

a lamp board, arranged at the first surface of the backplane;

a thermally conductive connecting layer, arranged between the backplane and the lamp board, wherein the thermally conductive connecting layer is connected with the lamp board; and a heat dissipation assembly, arranged at the second surface of the backplane, wherein the heat dissipation assembly passes through the backplane and is then connected with the thermally conductive connecting layer, the heat dissipation assembly comprises a heat sink;

wherein a surface of the heat sink configured to be connected with the thermally conductive connecting layer is coated with thermally conductive silica gel.

* * * * *